Dec. 14, 1926.

E. MITCHELL 1,610,804

SPLASH GUARD FOR VEHICLE WHEELS

Filed Nov. 17, 1924     3 Sheets-Sheet 1

INVENTOR
Ernest Mitchell

Dec. 14, 1926.  
E. MITCHELL  
1,610,804  
SPLASH GUARD FOR VEHICLE WHEELS  
Filed Nov. 17, 1924  3 Sheets-Sheet 2

INVENTOR  
Ernest Mitchell  
by Lowden O'Brien  
atty.

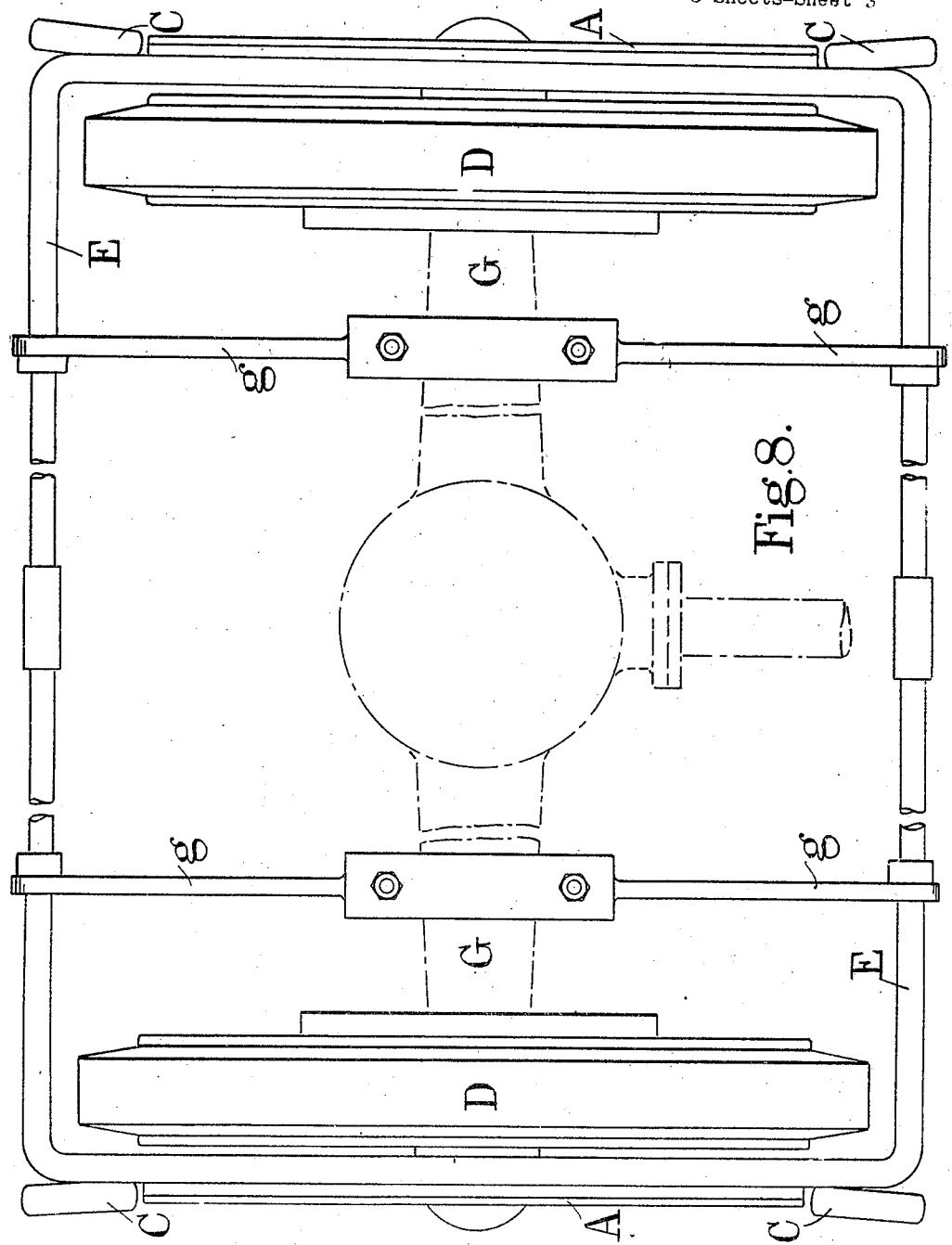

Patented Dec. 14, 1926.

1,610,804

UNITED STATES PATENT OFFICE.

ERNEST MITCHELL, OF MONTON, ENGLAND.

SPLASH GUARD FOR VEHICLE WHEELS.

Application filed November 17, 1924. Serial No. 750,412, and in Great Britain November 29, 1923.

This invention relates to improvements in splash guards for the wheels of motor and other road vehicles of the type adapted to be moved vertically when coming into contact with the curb or other obstruction.

According to the present invention the frame carrying the guard is fitted with wheels or runners upon the outside disposed at an acute angle to the vertical plane of the vehicle wheel, and to the face of the guard so that when the guard comes into contact with the curb or other obstruction the wheels will be raised carrying the guard with them and so prevent damage to the latter.

The invention will be described with reference to the accompanying drawings.

Fig. 8 is a plan view showing the invention applied to the rear wheels of a motor vehicle.

The guard or fender A which is of rubber or other flexible material is riveted or otherwise affixed to a bracket B formed at each end with an upwardly extending arm $b$.

Figure 1:
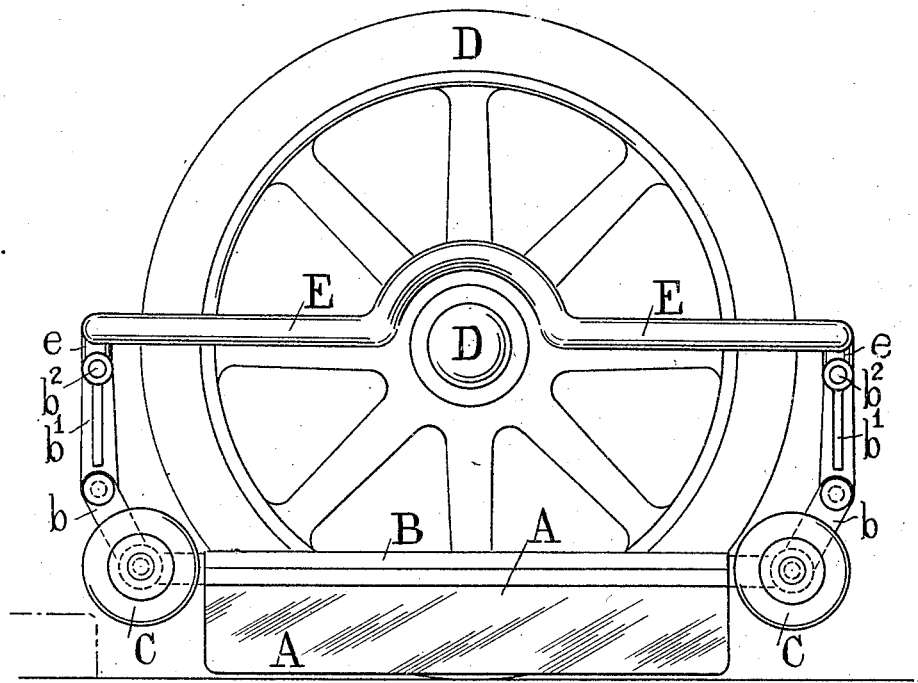
Fig. 1 is a front view of guard applied to the front wheel of a motor vehicle.
Figure 3:
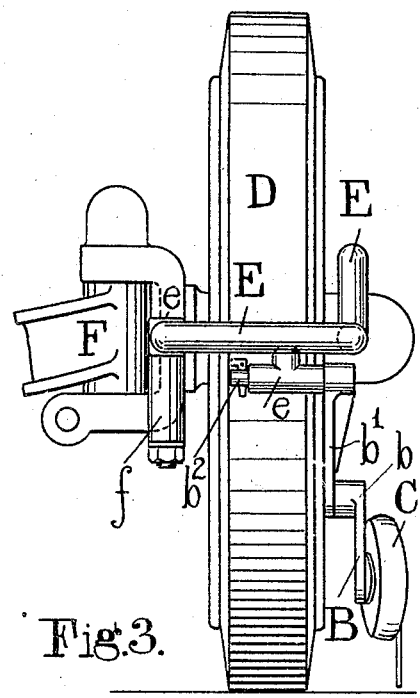
Fig. 3 is an end view of same.
Figure 4:
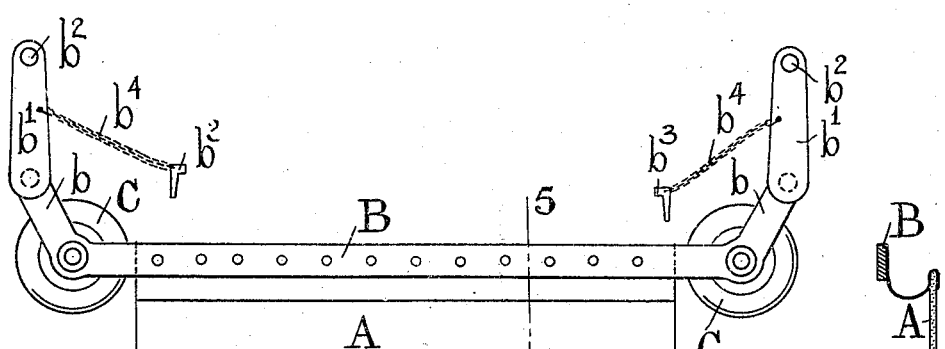
Fig. 4 is a front view of the bracket carrying the guard detached from the wheel.
Figure 5:
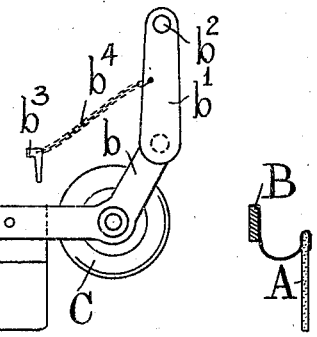
Fig. 5 is a section on line 5—5 Fig. 4.
Figure 6:
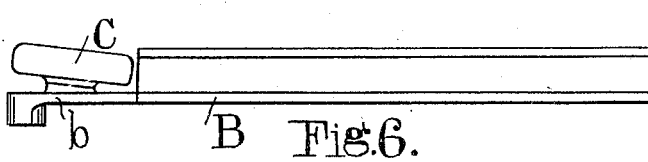
Fig. 6 is a plan of Fig. 4.

Two wheels C of rubber are journalled on the bracket B one at each point where the arms $b$ extend upwards therefrom as shown in Figs. 3, 6 and 8, the wheels C are set at an acute angle to the vertical plane of the road wheel D and the face of the guard A. The bottom of the wheels C are some distance above the bottom of the wheels B and to the front of and above the bottom of the guard or fender A as shown in Figs. 1, 3 and 4.

The upper end of each arm $b$ of the bracket B is pivotally mounted on a link $b^1$ the upper end of which carries an inwardly extending pivot $b^2$ adapted to engage in a hollow tube $e$ brazed or otherwise affixed to the underside of a frame E formed of hollow tubing. The pivots $b^2$ extend through the tubes $e$ and are secured therein by pins $b^3$ affixed to the members $b$ by chains $b^4$. The pins $b^3$ pass through slots formed in the pivots $b^2$.

Figure 2:
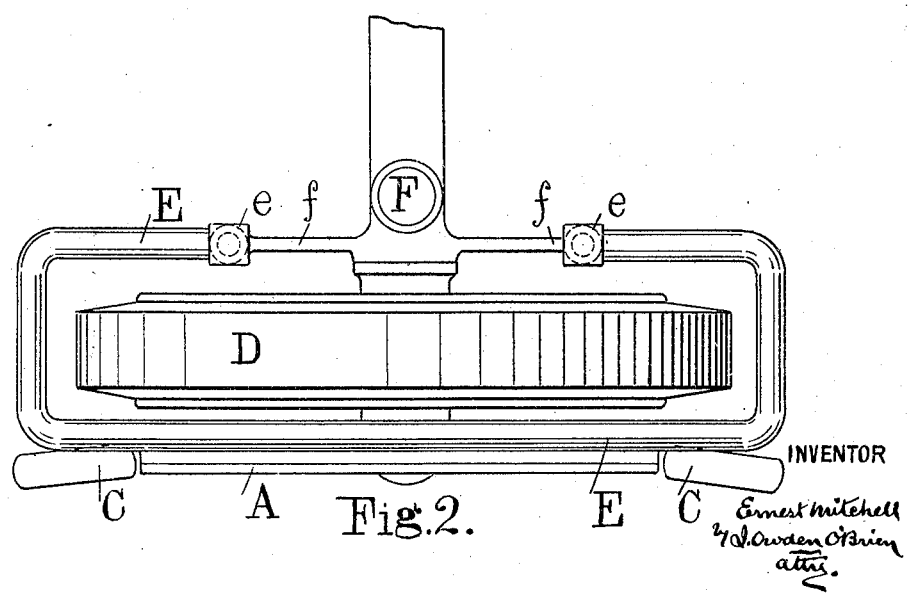
Fig. 2 is a plan of same.
Figure 7:
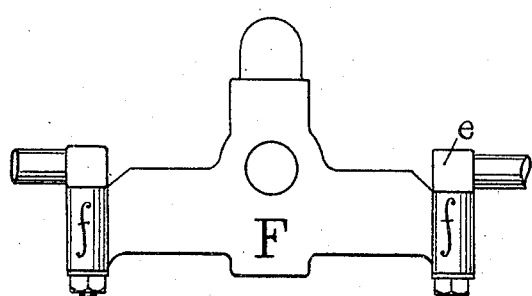
Fig. 7 is a front view of the end of the stub axle to which a tubular frame carrying the bracket is affixed.

As applied to the front wheels (Figs. 1, 2, 3 and 7) the hollow frame E passes to the back of the wheel C as shown in Figs. 2 and 3 and the ends $e^1$ are affixed to lugs $f$ formed on the end of the stub axle F. As applied to the rear wheels (Fig. 8) the hollow tubular framing E extends across the underside of the chassis and is supported by two brackets $g$ mounted on the housing G of the back axle. Any other method of affixing the frame E in position may be employed according to the type of vehicle to which it is to be applied.

In operation should the wheels C come into contact with the curb or other obstruction, they begin to climb up the latter immediately and so lift the guard and prevent damage thereto.

The brackets B are readily removed from the tubular frame E by removing the pins $b^3$ and pulling out the pivots $b^2$ from the tubes $e$.

What I claim as my invention and desire to protect by Letters Patent is:—

1. In an anti-splash device for the road wheels of motor and other road vehicles, the combination with the road wheel of a bracket, a guard carried by the said bracket, wheels therein fitted in front of and at an acute angle to the vertical plane of the face of the guard and of the road wheel and pivoted links on which said bracket is suspended so that it will rise when the wheels on the bracket meet the curb or other obstruction.

2. An anti-splash device for the road wheels of motor and other road vehicles comprising in combination a bracket, a guard affixed to said bracket, wheels fitted to the front of and at an acute angle to the vertical plane of the face of the guard and pivoted links on which said bracket is non-rigidly suspended to permit it to rise when the wheels on the bracket meet the curb or other obstruction, and a hollow tubular frame to which the pivoted links are pivotally connected adapted to be attached to a vehicle axle.

In testimony whereof I have hereunto set my hand.

ERNEST MITCHELL.